United States Patent [19]

Cerny

[11] Patent Number: 5,123,157
[45] Date of Patent: Jun. 23, 1992

[54] METHOD OF MAKING A ROTOR FOR AN ELECTROMAGNETIC CLUTCH

[75] Inventor: Zdenek Cerny, Brampton, Canada

[73] Assignee: Tesma International Inc., Concord, Canada

[21] Appl. No.: 682,327

[22] Filed: Apr. 9, 1991

Related U.S. Application Data

[63] Continuation-in-part of Ser. No. 513,630, Apr. 24, 1990, abandoned.

[51] Int. Cl.⁵ .............................................. H01F 41/02
[52] U.S. Cl. .................................... 29/607; 29/527.6; 29/602.1; 192/84 C
[58] Field of Search ..................... 192/107 M, 84 C; 29/607, 602.1, 527.6

[56] References Cited

U.S. PATENT DOCUMENTS

| | | |
|---|---|---|
| 2,919,777 | 1/1960 | Walter . |
| 3,082,933 | 3/1963 | Bernard . |
| 3,205,989 | 9/1965 | Mantey . |
| 3,384,213 | 5/1968 | Bernard . |
| 4,694,945 | 9/1987 | Koitabashi . |

FOREIGN PATENT DOCUMENTS

| | | |
|---|---|---|
| 61-59028 | 3/1986 | Japan . |
| 63-43035 | 2/1988 | Japan . |
| 63-243534 | 10/1988 | Japan . |
| 1007067 | 10/1965 | United Kingdom . |
| 1281082 | 7/1972 | United Kingdom . |
| 1482724 | 8/1977 | United Kingdom . |
| 1500766 | 2/1978 | United Kingdom . |
| 2148760 | 6/1985 | United Kingdom . |
| 2213762 | 8/1989 | United Kingdom . |

Primary Examiner—Carl E. Hall
Attorney, Agent, or Firm—Cushman, Darby & Cushman

[57] ABSTRACT

A method of making a rotor for an electromagnetic clutch. The rotor comprises an inner annular portion, an annular clutch portion extending outwardly from an end of the inner annular portion and having a series of arcuate slots extending therethrough and an outer annular portion extending from an outer end of the annular clutch portion. The clutch portion has a coupling surface finished for engaging a cooperating coupling surface of an armature having a series of arcuate slots therein cooperable with the arcuate slots of the clutch portion so as to establish a magnetic flux path which passes back and forth between the rotor clutch portion and the armature a plurality of times. The inner and outer annular portions have opposed annular surfaces finished for cooperating with a fixed annular magnetic coil therebetween so that when the magnetic coil is energized a magnetic flux field is established within flux paths within the inner and outer annular portions connecting with the flux path between the rotor clutch portion and the armature. The method comprises the steps of casting a one-piece body of cast iron having a configuration similar to the rotor provided with cast surfaces defined by the casting procedure instead of the finished surfaces of the rotor, and providing the finished surfaces including removing from the one-piece cast iron body a relatively small amount of cast iron defining the cast surfaces.

33 Claims, 3 Drawing Sheets

METHOD OF MAKING A ROTOR FOR AN ELECTROMAGNETIC CLUTCH

This application constitutes a continuation-in-part of my copending application, Ser. No. 07/513,630, filed Apr. 24, 1990, now abandoned.

This invention relates to electromagnetic clutches and more particularly to electromagnetic clutches of the type used in automotive air conditioning systems to drive the compressor.

The use of electromagnetic clutches to selectively drive the compressor of an automotive air conditioning system presents peculiar difficulties which are not necessarily presented in other uses. A primary limitation is that the electrics of the clutch must be suitable to the battery powered electrics inherent in automotive operation. The limitation on the electrics involved is a function of the magnetic flux that can be generated and the magnetic flux flow paths that can be provided between the rotor and the armature plate which is connected to drive the compressor when the electrics are actuated.

A typical electromagnetic clutch includes a rotor which generally comprises an inner annular bearing portion, an annular frictional-engaging or clutch portion extending generally radially outwardly from an end of the bearing portion, and an outer annular drive portion extending from an outer end of the clutch portion in generally overlying spaced relation with respect to the inner bearing portion. The spacing between the inner and outer annular portions receives the electromagnetic coil therebetween which is energized to create the flux field in the rotor. The clutch portion includes a series of arcuate slots, frequently referred to as banana slots, and cooperates with an armature plate which itself has cooperating arcuate slots therein. The purpose of the arcuate slots is to direct the flux field back and forth between the armature plate and clutch portion of the rotor which, in turn, is a measure of the efficiency of the magnetic attraction between the armature plate and the rotor. The magnetic attraction between the rotor and armature plate thus generated enables the torque of the rotor to be transmitted to the armature plate and hence, in turn, to the compressor. The transmission of torque from the rotor to the armature is a function of the magnetic attraction that can be generated between the rotor and armature plate and the lever arm through which the attraction acts. As the diameter of the rotor and armature plate is increased, the amount of torque which can be transmitted for the same magnetic attraction is increased. However, for each incremental increase in diameter size, the size and weight of the rotor increase by a square function with a commensurate increase in cost.

Thus, it is not just a simple matter of increasing the diameter size of the rotor to suit the electrical capabilities. This is particularly true when it is considered that, within the engine compartment, both space and weight are at a premium. Moreover, there is a trend toward automotive systems requiring that the compressor operate at greater speeds. Rotor speed is simply a function of the diameter size of the rotor pulley or other exterior driving surface provided by the outer annular portion. More and more it is becoming desirable to maximize the diameter size of the rotor at the clutch end which interfaces with the armature plate while minimizing the diameter size of the remaining portion which must provide the exterior driving surface and house the magnetic coil.

The need to provide this configuration has materially increased the difficulty and costs of making the rotor. Whereas before, the inner and outer annular portion could both be cylindrical and disposed in parallel relation, it became necessary to provide an interior space adjacent the clutch portion with a radial dimension greater than the radial dimension of the remaining interior space. Stated differently, instead of the flux path being simply axially outwardly along the outer rotor portion to the outer end of the clutch rotor portion, the flux path had to extend upwardly and outwardly along the outer portion to the outer end of the clutch portion. With this interior space configuration, a one-piece forging could no longer be utilized. The current practice is to forge or otherwise form the rotor in two parts, one of which provides the inner cylindrical portion and the clutch portion and the other of which provides the outer portion. It has long been known that the inherent joint which must result from joining the two parts presents a barrier in the magnetic flux path which diminishes the magnetic efficiency of the unit. Moreover, it is more costly to fabricate two parts and then unite the two parts than it is to fabricate a one-piece part.

There have been many efforts to achieve this type of configuration in a one-piece part which will eliminate the inherent debilitating joint It has been proposed to make a one-piece rotor from steel by forging and machining procedures, but the configurations which can be made are limited and costs are high. This basic type of procedure and the limitations and disadvantages thereof are set forth in U.S. Pat. No. 4,694,945, as the known state of the art of one-piece rotor technology upon which the disclosed subject matter is proposed as an improvement. The improvement of the disclosed subject matter is to start with a plate in a washer-like configuration made of steel or any other magnetic material which is capable of being pressed and drawn. The washer-like blank is first pressed and drawn to provide an inner cylindrical wall, a radial wall extending out from one end thereof and an outer cylindrical wall extending from the outer periphery of the radial wall in generally coextensive relation with the inner cylindrical wall. In short, the first step is to cold form from the flat washer a simple side opening U-shaped configuration. In this form, the arcuate slots are cut into the radial wall. Next, the side opening U-shaped blank is subjected to reverse drawing or upset working to press outer and inner cylindrical enlargements at the juncture of the radial wall with the inner and outer walls after which the inner wall is larger in diameter than its enlargement joint and the outer wall is smaller in diameter than its enlargement joint.

While the disclosed mode of proceeding and the resultant configuration may be regarded as cost effective when compared with forging and the configurations which can be achieved in this manner, it is readily apparent that there are still severe limitations on the configuration which can be achieved.

In Japanese Patent Publication No. 61-59028, a configuration similar to that disclosed in the aforesaid U.S. Pat. No. 4,694,945, is said to be achieved by starting with a blank having an of the U.S. patent and an inner configuration defined by two cylinders intersected by a radial plane. In short, the starting body has a simple rectangular opening but the exterior enlargements are already formed. In addition, it is proposed that the starting body would also have exterior non-through arcuate openings formed therein. The Japanese disclosure indicates that the initial body is manufactured through a process of closed forging in much the same way the U.S. patent describes the prior art. In addition, the Japanese publication disclosure suggests that the initial body could also be cast of cast steel. Once the initial body is provided, the interior surfaces are machined using an under-cutting tool to open up the slots. Here again, the final configurations which can be obtained are severely limited. There still exists a need for a cost-effective way of making an electromagnetic clutch rotor in one piece suitable for automotive use which is not restricted in the configurations which can be achieved by presently known methods.

It is an object of the present invention to fulfill the need expressed above. Applicant has found that the key to solving the problem of the way to manufacture the rotor does not reside in developing a new procedure but rather in utilizing a material to make the one-piece clutch rotor which has never been used before to make clutch rotors insofar as applicant is aware. Indeed, the material which is utilized in accordance with the principles of the present invention is one which could not be used in the process of U.S. Pat. No. 4,694,945 because it cannot be pressed and drawn in the manner required of the material of the U.S. patent process. Both steel and cast steel are inappropriate as materials in accordance with the principles of the present invention.

In accordance with the principles of the present invention, the objectives can be achieved by utilizing cast iron as the material so that it becomes possible to initially form the clutch rotor into any configuration which can be achieved by sand-casting methods. Of primary importance is the relatively low pouring temperatures involved and the relatively low shrinkage rates as compared with steel. The relatively high pouring temperatures and shrinkage rates of steel make the use of steel impractical because of stress cracking in the webs between the arcuate slots. Moreover, these inherent characteristics make it virtually impossible to achieve the accuracies required to make the use of casting procedures cost effective. The accuracies which can be achieved with cast iron insures that only relatively small amounts of cast iron material need be removed to provide a finished rotor, thus resulting in substantial savings in material wastage. Applicant has found that the higher carbon content of cast iron as compared with steel does not detrimentally effect the magnetic flux carrying properties of the material to the extent that might seem probable. It is believed this is because the larger amount of carbon contained in cast iron in comparison with steel is mostly in the form of graphite which is not as detrimental to magnetic flux-carrying characteristics as carbon in other forms such as are prevalent in steel. Moreover, applicant has found that when the graphite is nodular rather than flaky even less detriment to the magnetic flux-carrying characteristics are evident. Moreover, the higher coefficient of friction of cast iron results in an enhancement of the coupling ability of the rotor.

Accordingly, an object of the present invention is to provide a method of making a rotor for an electromagnetic clutch, the rotor comprising an inner annular portion, an annular clutch portion extending outwardly from an end of the inner annular portion and having a series of arcuate slots extending therethrough and an outer annular portion extending from an outer end of the annular clutch portion. The clutch portion has a coupling surface finished for engaging a cooperating coupling surface of an armature having a series of arcuate slots therein cooperable with the arcuate slots of the clutch portion so as to establish a magnetic flux path which passes back and forth between the rotor clutch portion and the armature a plurality of times. The inner and outer annular portions have opposed annular surfaces finished for cooperating with a fixed annular magnetic coil therebetween so that when the magnetic coil is energized a magnetic flux field is established within flux paths within the inner and outer annular portions connecting with the flux path between the rotor clutch portion and the armature. The method comprises the steps of casting a one-piece body of cast iron having a configuration similar to the rotor provided with cast surfaces defined by the casting procedure instead of the finished surfaces of the rotor, and then providing the finished surfaces including removing from the one-piece cast iron body a relatively small amount of cast iron defining the cast surfaces.

Another object of the present invention is to provide an electromagnetic clutch comprising a rotor rotatable about a rotational axis, an armature operable to be magnetically coupled with the rotor for rotation therewith, and a fixed annular magnetic coil energizable to magnetically couple the rotor and armature. The rotor includes an inner annular portion, an annular clutch portion extending outwardly from an end of the inner annular portion and an outer annular portion extending from an outer end of the clutch portion. The annular clutch portion includes a rotor coupling surface and a series of arcuate slots extending from the coupling surface through the annular clutch portion. The armature includes an armature plate having an armature coupling surface for engaging the rotor coupling surface and a series of arcuate slots positioned in cooperating relation with respect to the series of arcuate slots of the rotor clutch portion so as to establish a magnetic flux path which passes back and forth between the rotor clutch portion and the armature plate a plurality of times. The inner and outer annular portions include opposed spaced annular surfaces for receiving the annular magnetic coil therebetween so that when the magnetic coil is energized a magnetic flux field is established within magnetic flux paths within the inner and outer annular rotor portions connecting with the magnetic flux path between the clutch portion and the armature plate. The rotor is formed as a one-piece casting of cast iron so that the flux field within the rotor is established in flux paths defined by the cast iron of the one-piece casting and the rotor coupling surface is defined by the cast iron of the one-piece casting.

These and other objects of the present invention will become more apparent during the course of the following detailed description and appended claims.

The invention may best be understood with reference to the accompanying drawings wherein an illustrative embodiment is shown.

IN THE DRAWINGS

Figure 1:
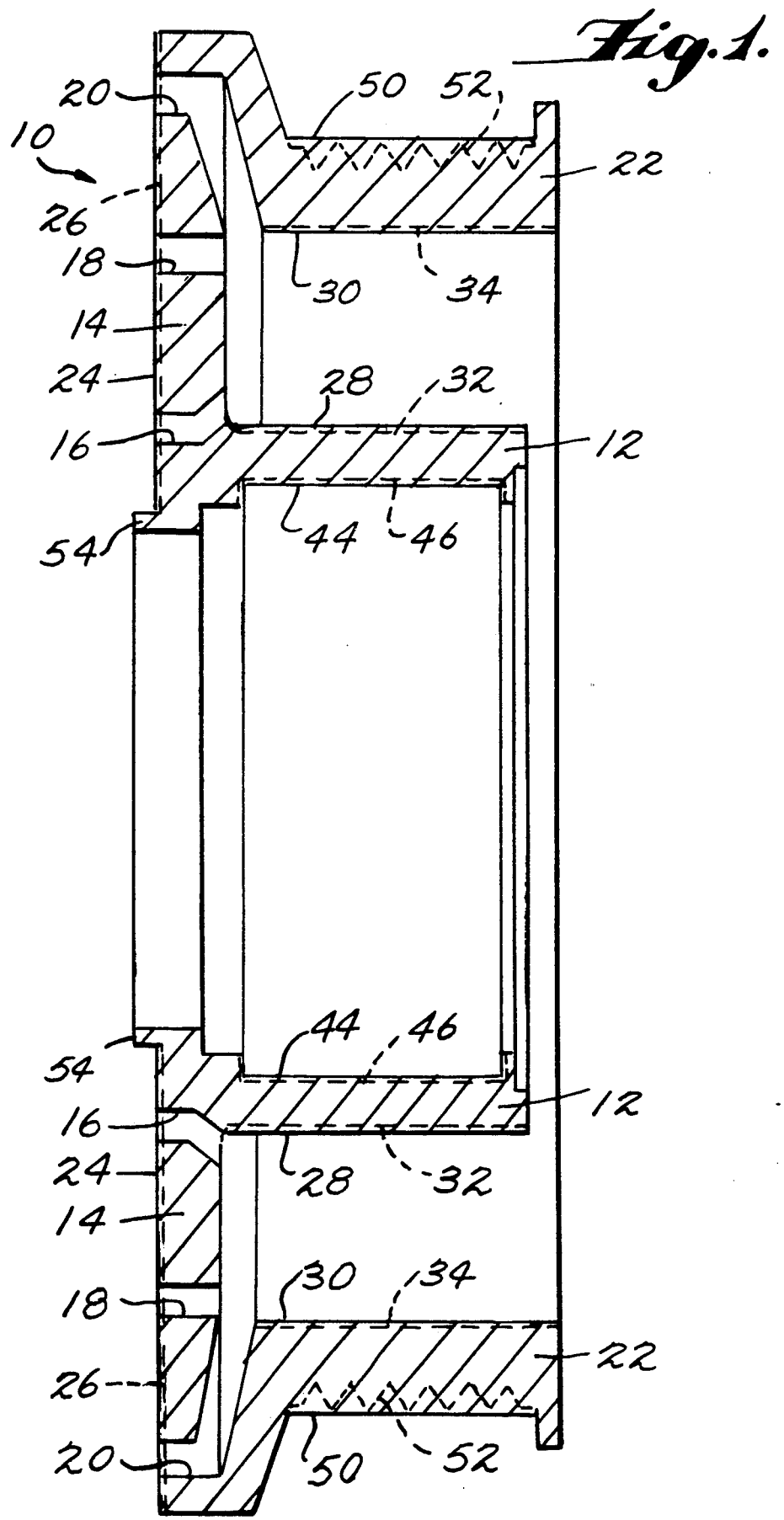
FIG. 1 is a vertical sectional view of a rotor body cast of cast iron in accordance with the principles of the present invention.

Referring now more particularly to FIG. 1 of the drawings, there is shown therein an electromagnetic clutch rotor body, generally indicated at 10, which has been cast in accordance with the principles of the present invention. A fundamental principle underlying the present invention is that the rotor is cast of cast iron rather than steel. In this regard, it has been found that the greater amount of carbon which is present in cast iron in comparison with steel does not detrimentally affect the magnetic properties of the cast iron rotor to the extent that would be expected. It is believed that the reason for this is that much of the carbon that is contained within cast iron is contained in the form of graphite rather than in the form which it appears in steel. Applicant has found that, while pearlitic cast iron with flaky graphite can be used, it is greatly preferred to utilized ferritic cast iron with nodular graphite. The nodular form of graphite seems to provide less of a barrier to magnetic flux flow. Ferritic cast iron with its nodular graphite is a desirable magnetically "soft" material, exhibiting a higher permeability and a lower coercive force resulting in a relatively lower hysteresis loss than that of pearlitic cast iron. Consequently, while in its broadest form, the invention contemplates both pearlitic and ferritic cast iron. The ferritic ductile cast iron is preferred and, more specifically, ferritic ductile cast iron which contains, in addition to the iron, the following components in the following amounts expressed in ranges:

| C  | 2.8 to 3.8 wt. %  |
|----|-------------------|
| Si | 1.8 to 5.5 wt. %  |
| Mn | 0.01 to 0.5 wt. % |
| Mg | 0.01 to 0.07 wt. %|
| Cu | 0.1 to 0.6 wt. %  |
| Co | 0.1 to 0.5 wt. %  |
| P  | 0.0 to 0.20 wt. % |
| S  | 0.0 to 0.20 wt. %.|

In conjunction with the utilization of cast iron, it has been found that the provision of a cast iron coupling surface actually enhances the ability of the rotor to transmit torque to the armature. It is thought that this may be because of the higher coefficient of friction of cast iron in comparison with steel. The hardness of the coupling surface is also a factor which contributes to the torque-transmitting capability of the present rotor. The silicon content within the cast iron determines to a considerable extent the hardness of the cast iron. The range given in the preferred embodiment is from 1.8 to 5.5. In the upper end of this range (e.g., 4.75 to 4.4), the amount of silicon is such as to impart a hardness to the cast iron body that renders it difficult to finish the surfaces which must be finished after the casting operation has been completed. With a silicon content in the high end range, the cast iron is of such hardness that the surface finishing cannot be economically performed by simple machining procedures such as turning on a lathe or grinding the surfaces. Instead, it becomes necessary to utilize more sophisticated equipment, as, for example, electro-discharge machines, which is, of course, more costly than conventional equipment.

Accordingly, a preferred range of the silicon is from 1.8 to 4.75 because within this range there is sufficient hardness imparted to the cast iron that surfaces requiring finishing can be accomplished simply by machining on the lathe or other such procedures without the necessity of resorting to more sophisticated equipment. It is noted, however, that insofar as the coupling surface itself is concerned within the preferred range it is desirable to complete the finishing of the coupling surface by surface hardening the surface.

With the above in mind, set forth below is a preferred cast iron which, in addition to the iron content, contains the following components and amounts:

| C  | 3.2 wt. %   |
|----|-------------|
| Si | 3.25 wt. %  |
| Mn | 0.1 wt. %   |
| Mg | 0.02 wt. %  |
| Cu | 0.3 wt. %   |
| Co | 0.3 wt. %   |
| P  | 0.01 wt. %  |
| S  | 0.01 wt. %. |

A further advantage of the utilization of cast iron is that the molten temperature and the shrinkage ratio enable the material to be cast with an accuracy which requires the removal of very little material so that there is very little waste material which is created in making the rotor. Moreover, the resultant casting has a good integrity and the characteristics with respect to stress cracking are satisfactory.

The rotor body 10 may be cast utilizing any of the known sand-casting procedures. These include investment castings, lost wax castings, and evaporate pattern castings. A preferred evaporate pattern casting method which is utilized in accordance with the principles of the present invention is specifically lost foam casting. The procedures utilized to accomplish the casting are those which are set forth in the article entitled "Unbonded Sand Molds" appearing on pages 230–234 in the 9th Edition, Volume 50, of the American Society for Metals, Metals Handbook. As a detailed background of the preferred procedure, the article is hereby incorporated by reference into the present specification. For present purposes, it is sufficient to note that the casting procedure includes the steps of forming a pattern or model of the cast iron rotor body from a material capable of being vaporized when contacting by molten cast iron, placing casting sand around the pattern in such a way as to leave a location to receive molten cast iron, pouring the molten cast iron into the receiving location until the pattern is vaporized by the molten cast iron and the cast iron replaces the pattern within the casting sand, allowing the molten cast iron to solidify to form the cast iron rotor body, and then separating the solidified cast iron rotor body from the casting sand.

More specifically, in forming the pattern, polystyrene beads are pre-molded into patterns and then glued in clusters with a gating system. The clusters are then dipped into a refractory coating and dried. The coated clusters are then secured in suitable position within individual casting flasks and a pouring cup is attached to the cluster to provide the pouring location. The flask is then filled with loose unbonded sand and packed around the cluster by imparting suitable vibrational movements to the flask and its contents. The molten iron, in accordance with the characteristics noted above, is first treated in conventional fashion to obtain the aforesaid iron and chemical composition and is then poured at a temperature of between 1,390° to 1,410° C.

into the cup, rapidly evaporating the low density patterns and gating and solidifying in approximately 40 minutes to a temperature of about 400° C. to obtain the cast iron rotor body such as shown in FIG. 1. When the cooling cycle is completed or after a secondary cooling to room temperature if desired, the cluster is removed from the flask. Individual model patterns are separated and then cleaned.

As shown in FIG. 1, the cast iron rotor body 10 is cast so as to have a configuration which is similar to the configuration required when used in an electromagnetic clutch assembly. Basically, the configuration includes an inner annular portion 12, an annular clutch portion 14 extending outwardly from an end of the inner annular portion 12 and having a series of inner, intermediate, and outer arcuate slots 16, 18, and 20 extending therethrough and an outer annular portion 22 extending from an outer end of the annular clutch portion 14. The clutch portion 14 has a cast surface 24 on the side thereof remote from the inner and outer portions 12 and 22 which is formed in the casting procedure instead of a coupling surface 26, shown in dotted lines in FIG. 1, finished after the casting operation to perform a clutch coupling function in operation. The inner and outer annular portions 12 and 22 have opposed annular cast surfaces 28 and 30, which are formed in the casting procedure instead of opposed annular surfaces 32 and 34, shown in dotted lines in FIG. 1, finished after the casting operation to perform a magnetic flux field receiving function.

In addition to the surfaces required for the flux carrying and clutch coupling functions, the rotor must also interface with other structure which effects its rotational mounting and driving connection. In its simplest form, this interface may simply be a fixed connection with a driven or driving shaft. The rotor body 10 shown in FIG. 1 is particularly configured for use in an electromagnetic clutch, generally indicated at 36, and shown in FIGS. 2-4 connected to be driven by the serpentine belt 38 of an automotive serpentine accessory drive so as to selectively drive a compressor shaft 40 rotatably mounted within and extending outwardly from a compressor housing 42 of the compressor assembly of the accessory drive.

Figure 2:
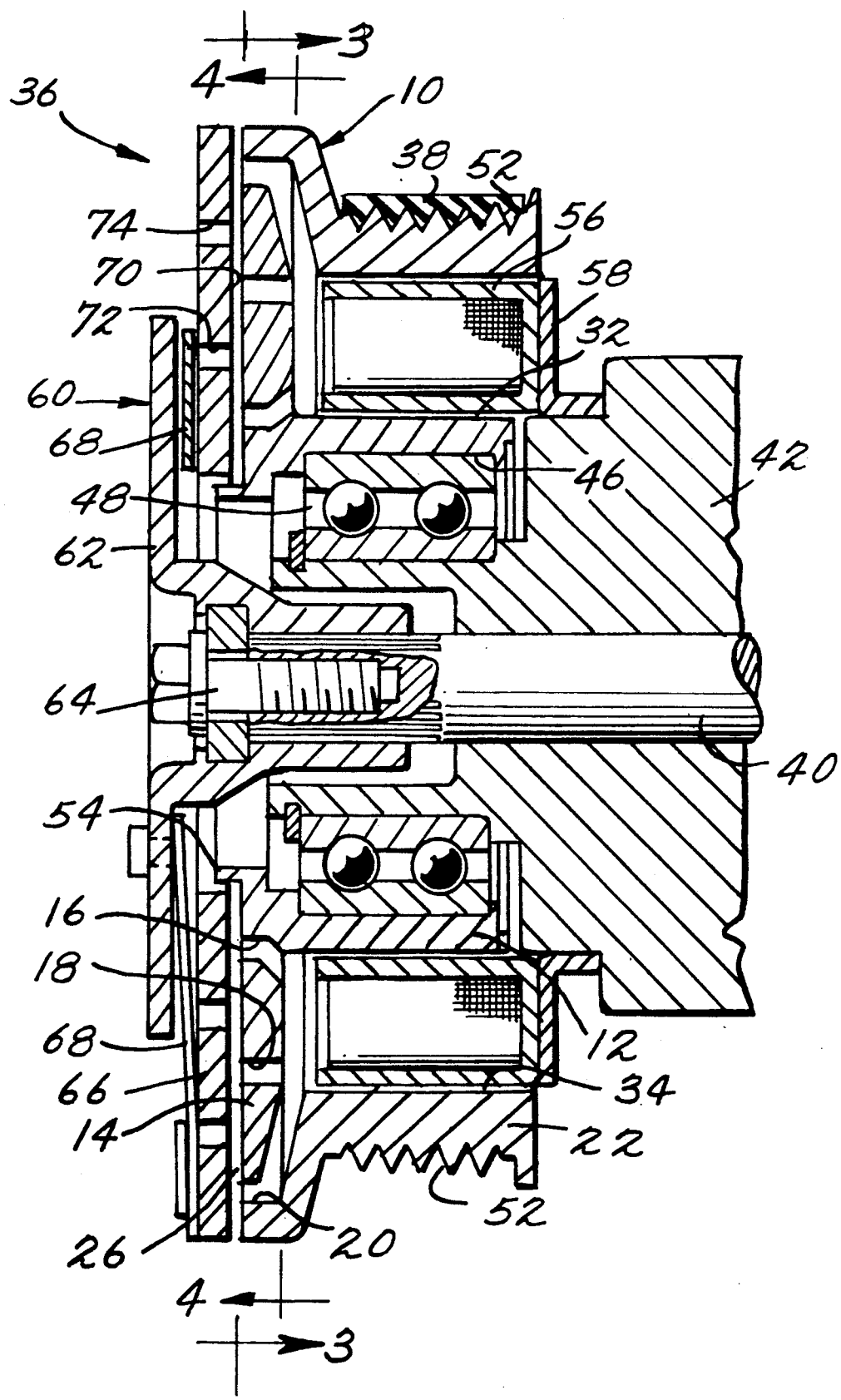
FIG. 2 is a vertical section view of an electromagnetic clutch constructed in accordance with the principles of the present invention.
Figure 3:
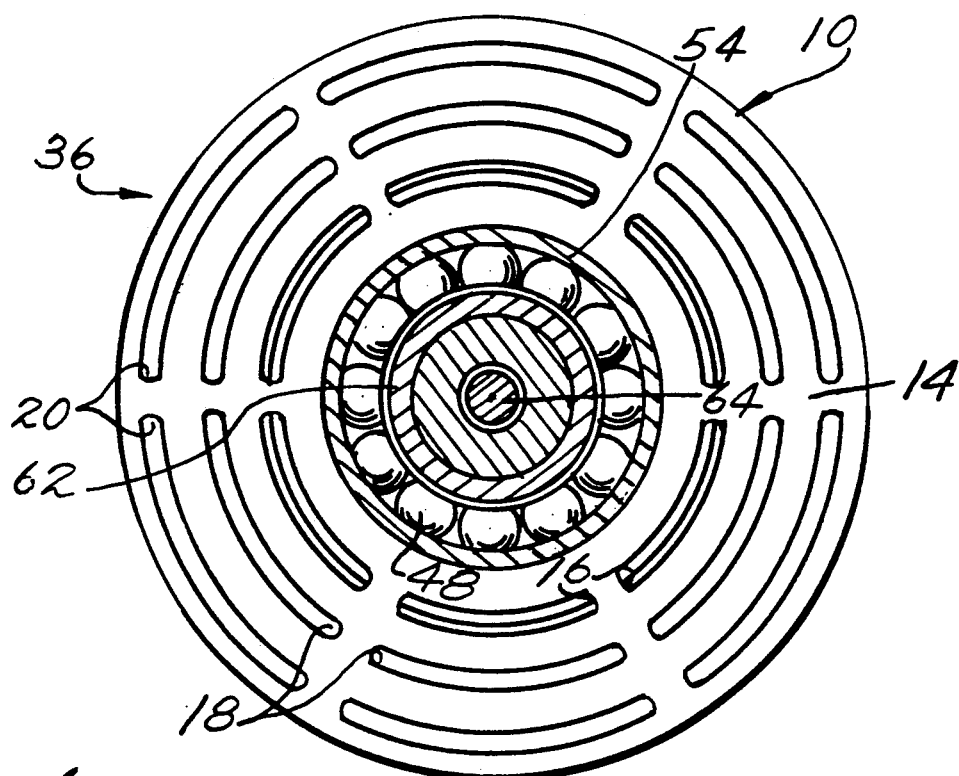
FIG. 3 is a sectional view taken along the line 3—3 of FIG. 2.
Figure 4:
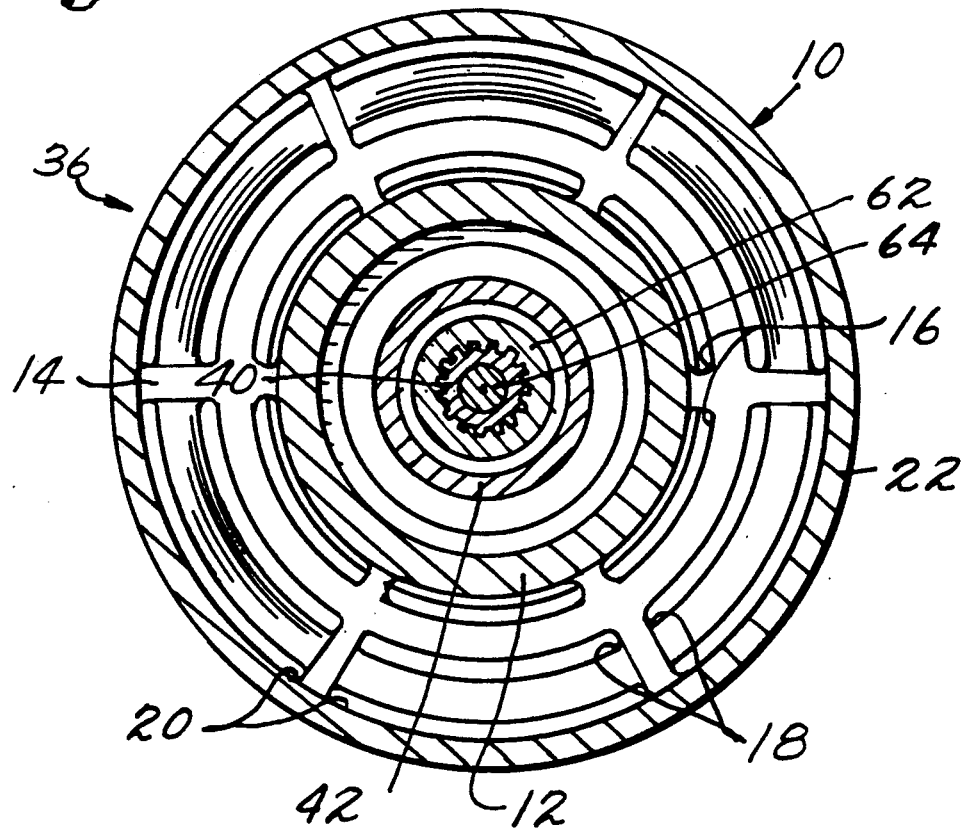
FIG. 4 is a sectional view taken along the line 4—4 of FIG. 2.

To this end, it will be noted that the inner portion 12 of the cast iron rotor body 10 has an inner annular cast surface 44 which is formed in the casting operation instead of an inner annular surface 46, shown in dotted lines in FIG. 1. As best shown in FIG. 3, the surface 46 is finished so as to engage the outer race of a ball bearing assembly 48, the inner race of which is mounted on the fixed support provided by the compressor housing 42. The outer annular portion 22 of the rotor body 10 has a cast outer annular surface 50, which is formed during the casting operation instead of an outer poly-V surface configuration 52. As best shown in FIG. 2, the poly-V surface configuration 52 is finished after the casting operation so as to be drivingly engaged by the poly-V belt 38.

As an added feature suitable for the particular application, the rotor body 10 is cast to include an annular grease guard portion 54. As shown, the grease guard portion 54 is disposed within the junction between the inner annular portion 12 and the clutch portion 14 and extends slightly axially therefrom.

As previously indicated, it is an important feature that the finished surfaces 26, 32, 34, 46, and 52 can be provided in a cost effective manner after the rotor body 10 has been cast in a cost effective manner. Cost effectiveness is achieved by minimizing the amount of cast iron material which must be removed to provide the finished surfaces and by utilizing the more conventional machining procedures to effect material removal. In addition, the only surface treatments that are required are surface hardening and corrosion resistance.

The finished surfaces 26, 32, 34, and 46 are all preferably turned on a lathe. The accuracy which can be achieved in the casting body 10 is such that the amount of material removed is a layer which including the cast surfaces 24, 28, 30, and 44 of a thickness of within 0.6 to 1.2 millimeters. The other finished surface 52 can likewise be turned on a lathe. The cast surface 50 is a cylindrical surface rather than a poly-V surface because, in turning the poly-V surface 52, it is simpler to start with a cylindrical surface than a poly-V. It will be understood that, where the drive configuration is a V-belt configuration, the cast surface would be parallel with the V and the material removed would be a layer within the range previously noted. It will also be noted that the material removal in order to make the poly-V surface 52 is minimized by making the crests of the poly-V grooves within the aforesaid range from the 30 cast surface 50.

Surface hardening is desirable in the finishing of the clutch coupling surface 26. A preferred surface hardening procedure is a gas nitriding treatment which is carried on for a time period and at a temperature sufficient to establish a resultant white layer within a range of 10-15 microns. It will be understood that other surface hardening treatments may be utilized if desired such as flame hardening, induction hardening, carbon-nitriding, plating, ion implantation, carburizing, vapor disposition, electrolysis nickel deposition, plasma, thermal-spray and similar other procedures. The preferred gas nitriding procedure is carried out after all of the machining operations have been completed and, since the gas nitriding procedure is carried out in an oven, not only the coupling surface 26 is heat treated but the other surfaces of the casting as well including the other machine surfaces.

With respect to the corrosion resistance treatment, this could be a special heat treatment but a preferred treatment is to simply apply a coat of paint to the surfaces which require it. Basically, the manner in which the painting procedure is carried out is to face off the coupling surface 26 and the bearing engaging surface 46 and simply spray the remaining surfaces with a suitable corrosive resistant paint which does not affect the magnetic flux carrying capabilities.

It will be understood that, once the rotor body 10 has been provided with the finished surfaces, the finished rotor 10 can then form a part of an electromagnetic clutch, such as the clutch 36 shown in FIG. 2. In this regard, it will be noted that the clutch 36 also includes an annular electromagnetic coil 56 which is fixed to the support provided by the compressor housing 42 by any suitable means such as bracket 58. The magnetic coil 56 is held in fixed relation within the space between the finished surfaces 32 and 34 of the rotor 10. The electromagnetic clutch 36 also includes an armature assembly, generally indicated at 60, which includes an annular mounting member 62 which is splined to the end of the compressor shaft 40 and fixedly secured thereon as by a bolt 64. The armature assembly 60 also includes an armature plate 66 which is connected with the armature mounting member 62 to rotate therewith and to have a limited amount of axial movement with respect thereto.

This functional mounting of the armature plate 66 with the armature mounting member 62 is accomplished in the usual fashion by three resilient strap members 68 having opposite ends suitably pinned to the armature mounting member 62 and the armature plate 66.

It will be noted that the armature plate 66 is preferably formed of steel in the usual manner although it is within the scope of the present invention to cast the armature plate of cast iron in accordance with the procedures noted above for the rotor. In accordance with usual practice, the armature plate 66 includes a coupling surface 70 and a series of inner and outer arcuate slots 72 and 74 which are disposed in cooperating relation with respect to the series of arcuate slots 16, 18, and 20 in the rotor clutch portion 14 so that the magnetic flux generated by the magnetic coil 56 will be caused to flow in a flux path which extends between the clutch portion 14 and the armature plate 66 a plurality of times.

As shown, when the electromagnetic coil 56 is energized, a magnetic field is established which creates a magnetic flux flow path from the magnetic coil 56 through the outer annular portion 22 of the rotor past outer arcuate slots 20 and then onto the armature plate 66. Because of the outer slots 74 of the armature plate 66, the magnetic flux flows in a path back to the clutch portion 14 inwardly of the outer arcuate slots 20. The magnetic flux path continues until it reaches the intermediate arcuate slots 18 at which point it passes over to the armature plate 66 inwardly of the outer slots 74 therein. The inner slots 72 of the armature plate 66 cause the magnetic flux path to again cross over to the clutch portion 14 inwardly of the intermediate slots 18. Again, the inner arcuate slots 16 cause the magnetic flux path to again cross to the armature plate 66 below the inner slots 72. From the inner portion of the armature plate 66, the magnetic flux path is returned to the magnetic coil through clutch portion 14 and the inner portion 12. The manner in which the flux path is established between the rotor 10 and the armature plate 66 serves to move the armature plate axially so as to engage the armature coupling surface 70 with the rotor coupling surface 26. In this way, the rotary motion imparted to the rotor 10 by the serpentine belt 38 is transmitted to the compressor shaft 40.

Another important feature of the rotor 10 constructed in accordance with the principles of the present invention is that a much wider variety of different configurations can be produced. This is particularly important in that the inner and outer slots can be formed through the clutch portion 14 with angular bends or arcuate turns and it is not essential that the slots be straight through as is required in other procedures. This enables the magnetic flux path to be extended between the rotor 10 and the armature plate 66 to a greater outer extent along the outer areas of the crossing path and to a greater inner extent along the inner crossing path which insures a greater torque transmitting capability. The particular configuration of the inner and outer series of slots 16 and 20 shown in FIG. 2 is more particularly disclosed and claimed in my copending application, Ser. No. 682,462, filed concurrently herewith. The present invention is more particularly concerned with the method of making the rotor and the basic improvement in the electromagnetic clutch when utilized therein. Consequently, the method and improvement of the present invention are applicable not only to the specific electromagnetic clutch configuration shown in FIGS. 2-4 and the other specific configurations of my copending application, but any other configuration as well.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of making a rotor for an electromagnetic clutch, the rotor comprising an inner annular portion, an annular clutch portion extending outwardly from an end of said inner annular portion and having arcuate slot means extending therethrough and an outer annular portion extending from an outer end of said annular clutch portion, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means of said rotor, and providing said finished surface means including removing a relatively small amount of cast iron from said one-piece cast iron body including the cast iron defining said cast surface means.

2. A method as defined in claim 1 wherein the relatively small amount of cast iron removed from said one-piece cast iron body comprises layer including said cast surface means having a thickness between 0.6 and 1.2 millimeters.

3. A method of making a rotor for an electromagnetic clutch, the rotor comprising an inner annular portion, an annular clutch portion extending outwardly from an end of said inner annular portion and having arcuate slot means extending therethrough and an outer annular portion extending from an outer end of said annular clutch portion, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and armature, said coupling surface means and said opposed annular surface means comprising finished surface means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means of said rotor, and providing said finished surface means including removing a relatively small amount of cast iron from said one-piece cast iron body including the cast iron defining said cast surface means, the relatively small amount of cast iron removed from said one-piece cast iron body comprising layer means including said cast surface means having a thickness between 0.6 and 1.2 millimeters.

said cast iron being ferritic ductile cast iron with nodular graphite which comprises in addition to iron the following components and amount thereof;

| | |
|---|---|
| C | 2.8 to 3.8 wt. % |
| Si | 1.8 to 5.5 wt. % |
| Mn | 0.01 to 0.5 wt. % |
| Mg | 0.01 to 0.07 wt. % |
| Cu | 0.1 to 0.6 wt. % |
| Co | 0.1 to 0.5 wt. % |
| P | 0.0 to 0.20 wt. % |
| S | 0.0 to 0.20 wt. %. |

4. A method as defined in claim 3 wherein the amount of said Si component is within the range of 1.8 to 4.75 wt. %.

5. A method as defined in claim 4 wherein the procedure for removing a small amount of cast iron defining the cast surface means provided instead of said coupling surface means is a lathe-turning procedure which obtains a machined coupling surface means, the step of providing of said finished coupling surface means also including surface hardening the machined coupling surface means to provide said finished coupling surface means.

6. A method as defined in claim 5 wherein said surface hardening is a gas nitriding treatment under heat.

7. A method as defined in claim 6 wherein the procedure for removing a small amount of cast iron defining the cast surface means provided instead of said opposed annular surface means is a lathe-turning procedure which obtains machined opposed surface means, the step of providing said finished opposed annular surface means also including surface hardening the machined opposed surface means to provide surface hardened opposed surface means and thereafter painting the surface hardened opposed surface means to providing the finished opposed surface means.

8. A method as defined in claim 7 wherein said cast iron body is cast by a casting.-procedure which includes the steps of forming a pattern of said cast iron body from a material capable of being vaporized when contacted by molten cast iron, placing casting sand around the pattern in such a way as to leave a location to receive molten cast iron, pouring molten cast iron into the receiving location until the pattern is vaporized by the molten cast iron and the cast iron replaces the pattern within the casting sand, allowing the molten cast iron to solidify to form said cast iron body and then separating the solidified cast iron body from the casting sand.

9. A method as defined in claim 8 wherein said pattern is formed of polystyrene and is coated with a refractory before the casting sand is placed therearound.

10. A method as defined in claim 9 wherein said cast iron comprises in addition to iron the following components and amounts thereof:

| | |
|---|---|
| C | 3.2 wt. % |
| Si | 3.25 wt. % |
| Mn | 0.1 wt. % |
| Mg | 0.02 wt. % |
| Cu | 0.3 wt. % |
| Co | 0.3 wt. % |
| P | 0.01 wt. % |
| S | 0.01 wt. %. |

11. A method as defined in claim 3 wherein the amount of said Si component is within the range of 5.0 to 5.25 wt. %, and in the step of providing said finished coupling surface means the procedure for removing a relatively small amount of cast iron defining said cast surface means instead of said finished coupling surface means is an electro-discharge machine procedure which produces said finished coupling surface means.

12. A method of making a rotor for an electromagnetic clutch suitable for automotive use, the rotor comprising an inner annular portion, an annular clutch portion extending outwardly from an end of said inner annular portion and having arcuate slot means extending therethrough and an outer annular portion extending from an outer end of said annular clutch portion, said inner annular portion having inner annular mounting surface means finished for engaging annular bearing means, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portion having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said outer portion having an outer annular drive surface configuration finished for drivingly engaging driving means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means and said finished surface configuration of said rotor, and providing said finished surface means and said finished surface configuration including removing a relatively small amount of cast iron from said one-piece cast iron body including the cast iron defining said cast surface means.

13. A method as defined in claim 12 wherein the relatively small amount of cast iron removed from said one-piece cast iron body defining the cast surface means provided instead of said finished surface means comprises layer means including said cast surface means provided instead of said finished surface means, said layer means having a thickness of between 0.6 and 1.2 millimeters.

14. A method of making a rotor for an electromagnetic clutch suitable for automotive use, the rotor comprising an inner annular portion, an annular clutch portion extending outwardly from an end of said inner annular portion and having arcuate slot means extending therethrough and an outer annular portion extending from an outer end of said annular clutch portion, said inner annular portion having inner annular mounting surface means finished for engaging annular bearing means, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said outer portion having an outer annular drive surface configuration finished for drivingly engaging driving means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means and said finished surface configuration of said rotor, and providing said finished surface means and said finished surface configuration including removing a relatively small amount of cast iron from said one-piece cast iron body including the cast iron defining said cast surface means, the relatively small amount of cast iron removed from said one-piece cast iron body defining the cast surface means provided instead of said finished surface means comprising layer means including said cast surface means provided instead of said finished surface means, said layer means having a thickness of between 0.6 and 1.2 millimeters, said cast iron being ferritic ductile cast iron with nodular graphite which comprises in addition to iron the following components and amounts thereof:

| | |
|---|---|
| C | 2.8 to 3.8 wt. % |
| Si | 1.8 to 5.5 wt. % |
| Mn | 0.01 to 0.5 wt. % |
| Mg | 0.01 to 0.07 wt. % |
| Cu | 0.1 to 0.6 wt. % |
| Co | 0.1 to 0.5 wt. % |
| P | 0.0 to 0.20 wt. % |
| S | 0.0 to 0.20 wt. %. |

15. A method as defined in claim 14 wherein the amount of said Si component is within the range of 1.8 to 4.75 wt. %.

16. A method as defined in claim 15 wherein said the procedure for removing a small amount of cast iron from said cast iron body defining said cast surface means is a lathe-turning procedure to obtain machined surface means, the step of providing said finished surface means also including surface hardening the machined surface means.

17. A method as defined in claim 16 wherein said surface hardening is a gas nitriding treatment under sufficient heat and for a sufficient time to obtain a white layer within a range of 10–15 microns.

18. A method as defined in claim 16 wherein said finished coupling surface means and said finished mounting surface means are provided by said surface hardening treatment, said finished opposed surface means and said finished drive configuration being provided by painting after the surface hardening treatment thereof.

19. A method as defined in claim 18 wherein the cast surface means provided instead of said drive surface configuration is a cylindrical surface and said drive surface configuration is a poly-V pulley surface configuration.

20. A method of making a rotor for an electromagnetic clutch suitable for automotive use, the rotor comprising an inner annular portion, an annular clutch portion extending outwardly form an end of said inner annular portion and having arcuate slot means extending therethrough an outer annular portion extending from an outer end of said annular clutch portion, said inner annular portion having inner annular mounting surface means finished for engaging annular bearing means, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said outer portion having an outer annular drive surface configuration finished for drivingly engaging driving means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means and said finished surface configuration of said rotor, and providing said finished surface means and said finished surface configuration including removing a relatively small amount of cast iron from said one-piece cast iron body including the cast iron defining said cast surface means, said cast iron body being cast by a casting procedure which including the steps of forming a pattern of said cast iron body from a material capable of being vaporized when contacted by molten cast iron, placing casting sand around the pattern in such a way as to leave a location to receive molten cast iron, pouring molten cast iron into the receiving location until the pattern is vaporized by the molten cast iron and the cast iron replaces the pattern within the casting sand, allowing the molten cast iron to solidify to form said cast iron body and then separating the solidified cast iron body from the casting sand.

21. A method as defined in claim 20 wherein said model is formed of polystyrene and is coated with a refractory before the casting sand is placed therearound.

22. A method of making a rotor for an electromagnetic clutch suitable for automotive use, the rotor comprising an inner annular portion, an annular clutch portion extending outwardly from an end of said inner annular portion and having arcuate slot means extending therethrough and an outer annular portion extending from an outer end of said annular clutch portion, said inner annular portion having inner annular mounting surface means finished for engaging annular bearing means, said arcuate slot means including an inner series of arcuate slots extending through said clutch portion and an outer series of arcuate slots extending through said clutch portion, said clutch portion having coupling surface means finished for engaging cooperating coupling surface means of an armature having a series of arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said outer portion having an outer annular drive surface configuration finished for drivingly engaging driving means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means and said finished surface configuration of said rotor, and providing said finished surface means and said finished surface configuration including removing a relatively small amount of cast iron from said one-piece cast iron body including the cast iron defining said cast surface means, said cast iron being ferritic ductile cast iron with nodular graphite which comprises in addition to iron the following components and amounts thereof:

| | |
|---|---|
| C | 2.8 to 3.8 wt. % |
| Si | 1.8 to 5.5 wt. % |
| Mn | 0.01 to 0.5 wt. % |
| Mg | 0.01 to 0.07 wt. % |
| Cu | 0.1 to 0.6 wt. % |
| Co | 0.1 to 0.5 wt. % |
| P | 0.0 to 0.20 wt. % |
| S | 0.0 to 0.20 wt. %. |

23. A method as defined in claim 22 wherein said cast iron comprises in addition to iron the following components and amounts thereof:

| | |
|---|---|
| C | 3.2 wt. % |
| Si | 3.25 wt. % |
| Mn | 0.1 wt. % |
| Mg | 0.02 wt. % |
| Cu | 0.3 wt. % |
| Co | 0.3 wt. % |
| P | 0.01 wt. % |
| S | 0.01 wt. %. |

24. A method of making a rotor for an electromagnetic clutch, the rotor comprising an inner annular portion, an annular clutch portion extending outwardly from an end of said inner annular portion and having arcuate slot means extending therethrough and an outer annular portion extending from an outer end of said annular clutch portion, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means of said rotor, and providing said finished surface means including removing a relatively small amount of cast iron from said one-piece cast iron body including the cast iron defining said cast surface means, said cast iron being ferritic ductile cast iron with nodular graphite which comprises in addition to iron the following components and amounts thereof:

| | |
|---|---|
| C | 2.8 to 3.8 wt. % |
| Si | 1.8 to 5.5 wt. % |
| Mn | 0.01 to 0.5 wt. % |
| Mg | 0.01 to 0.07 wt. % |
| Cu | 0.1 to 0.6 wt. % |
| Co | 0.1 to 0.5 wt. % |
| P | 0.0 to 0.20 wt. % |
| S | 0.0 to 0.20 wt. %. |

25. A method of making a rotor for an electromagnetic clutch, the rotor comprising an inner annular portion, an annular clutch portion extending outwardly from an end of said inner annular portion and having arcuate slot means extending therethrough and an outer annular portion extending from an outer end of said annular clutch portion, said arcuate slot means including a series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means of said rotor, and providing said finished surface means including removing a relatively small amount of cast iron from said one-piece cast iron body including the cast iron defining said cast surface means, said cast iron body being cast by a casting procedure which includes the steps of forming a pattern of said cast iron body from a material capable of being vaporized when contacted by molten cast iron, placing casting sand around the pattern in such a way as to leave a location to receive molten cast iron, pouring molten cast iron into the receiving location until the pattern is vaporized by the molten cast iron and the cast iron replaces the pattern within the casting sand, allowing the molten cast iron to solidify to form said cast iron body and then separating the solidified cast iron body from the casting sand.

26. A method of making a rotor for an electromagnetic clutch, the rotor comprising an inner annular portion, an annular clutch portion extending outwardly from an end of said inner annular portion and having arcuate slot means extending therethrough and an outer annular portion extending from an outer end of said annular clutch portion, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portion having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means of said rotor, and providing said finished surface means including removing a relatively small amount of cast iron from said one-piece cast iron body including the cast iron defining said cast surface means, said one-piece body of cast iron being cast by a casting procedure which includes pouring molten cast iron at a temperature of between 1,390° C. to 1,410° C. into a sand-casting mold, allowing the molten cast iron to solidify into said one-piece body of cast iron and then separating the one-piece body of cast iron from the sand-casting mold.

27. A method of making a rotor for an electromagnetic clutch suitable for automotive use, the rotor comprising an inner annular portion, an annular clutch portion extending outwardly from an end of said inner annular portion and having arcuate slot means extending therethrough and an outer annular portion extending from an outer end of said annular clutch portion, said inner annular portion having inner annular mounting surface means finished for engaging annular bearing means, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said outer portion having an outer annular drive surface configuration finished for drivingly engaging driving means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means and said finished surface configuration of said rotor, and providing said finished surface means and said finished surface configuration including removing a relatively small amount of cast iron from said one-piece cast iron body including the cast iron defining said cast surface means, said one-piece body of cast iron being cast by a casting procedure which includes pouring molten cast iron at a temperature of between 1,390° C. to 1,410° C. into a sand-casting mold, allowing the molten cast iron to solidify into said one-piece body of cast iron and then separating the one-piece body of cast iron from the sand-casting mold.

28. A method as defined in claim 3, 14, 20, 22, 24, 25, 26 or 27 wherein said one-piece body of cast iron is cast with interior surface means defining arcuate spaces extending therethrough, said arcuate spaces including an inner series of arcuate spaces extending through said one-piece body of cast iron in positions such that, after the entirety of said rotor is formed by removal of cast iron from said one-piece body of cast iron, said inner series of arcuate spaces are within the inner series of arcuate slots extending through the annular clutch portion of said rotor, said arcuate spaces including an outer series of arcuate spaces extending through said one-piece body of cast iron in positions such that, after the entirety of said rotor is formed by removal of cast iron from said one-piece body of cast iron, said outer series of arcuate spaces are within the outer series of arcuate slots extending through the annular clutch portion of said rotor.

29. A method as defined in claim 28 wherein said interior surface means defines said arcuate slot means including inner and outer series of arcuate slots.

30. A method of making a rotor for an electromagnetic clutch, the rotor comprising an inner annular portion, an annular clutch portion extending outwardly from an end of said inner annular portion and having arcuate slot means extending therethrough and an outer annular portion extending from an outer end of said annular clutch portion, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means of said rotor, and providing said finished surface means including removing a relatively small amount of cast iron from said one-piece cast iron body including the cast iron defining said cast surface means, said one-piece body of cast iron being cast with interior surface means defining arcuate spaces extending therethrough, said arcuate spaces including an inner series of arcuate spaces extending through said one-piece body of cast iron in positions such that, after the entirety of said rotor is formed by removal of cast iron from said one-piece body of cast iron, said inner series of arcuate spaces are within the inner series of arcuate slots extending through the annular clutch portion of said rotor, said arcuate spaces including an outer series of arcuate spaces extending through said one-piece body of cast iron in positions such that, after the entirety of said rotor is formed by removal of cast iron from said one-piece body of cast iron, said outer series of arcuate spaces are within the outer series of arcuate slots extending through the annular clutch portion of said rotor.

31. A method as defined in claim 30 wherein said interior surface means defines said arcuate slot means including inner and outer series of arcuate slots.

32. A method of making a rotor for an electromagnetic clutch suitable for automotive use, the rotor comprising an inner annular portion, an annular clutch portion extending outwardly from an end of said inner annular portion and having arcuate slot means extending therethrough an outer annular portion extending from an outer end of said annular clutch portion, said inner annular portion having inner annular mounting surface means finished for engaging annular bearing means, said arcuate slot means including an inner series of arcuate slots extending through said clutch portion and an outer series of arcuate slots extending through said clutch portion, said clutch portion having coupling surface means finished for engaging cooperating coupling surface means of an armature having arcuate slot means therein cooperable with the arcuate slot means of said clutch portion including said inner and outer series of arcuate slots so as to establish a magnetic flux path which passes back and forth between the rotor clutch portion and the armature a plurality of times, said inner and outer annular portions having opposed annular surface means finished for cooperating with a fixed annular magnetic coil therebetween so that when the magnetic coil is energized a magnetic flux field is established within flux paths within said inner and outer annular portions connecting with the flux path between the rotor clutch portion and the armature, said coupling surface means and said opposed annular surface means comprising finished surface means, said outer portion having an outer annular drive surface configuration finished for drivingly engaging driving means, said method comprising the steps of casting a one-piece body of cast iron having a configuration which, upon removal of cast iron therefrom, forms the entirety of said rotor, said one-piece body of cast iron being provided with cast surface means defined by the casting procedure instead of said finished surface means and said finished surface configuration of said rotor, and providing said finished surface means and said finished surface configuration including removing a relatively small amount of cast iron from said one-piece cast iron body including the cast iron defining said cast surface means, said one-piece body of cast iron being cast with interior surface means defining arcuate spaces extending therethrough, said arcuate spaces including an inner series of arcuate spaces extending through said one-piece body of cast iron in positions such that, after the entirety of said rotor is formed by removal of cast iron from said one-piece body of cast iron, said inner series of arcuate spaces are within the inner series of arcuate slots extending through the annular clutch portion of said rotor, said arcuate spaces including an outer series of arcuate spaces extending through said one-piece body of cast iron in positions such that, after the entirety of said rotor is formed by removal of cast iron from said one-piece body of cast iron, said outer series of arcuate spaces are within the outer series of arcuate slots extending through the annular clutch portion of said rotor.

33. A method as defined in claim 32 wherein said interior surface means defines said arcuate slot means including inner and outer series of arcuate slots.

* * * * *